United States Patent [19]

Lawson et al.

[11] Patent Number: 4,581,808
[45] Date of Patent: Apr. 15, 1986

[54] ADJUSTABLE MACHINING SYSTEM AND IMPLEMENT THEREFORE

[75] Inventors: John R. Lawson, Lincoln; Raymond B. Harlan, Wayland; Keith Glick, Needham, all of Mass.

[73] Assignee: The Charles Stark Draper Laboratory, Cambridge, Mass.

[21] Appl. No.: 345,752

[22] Filed: Feb. 4, 1982

[51] Int. Cl.$^4$ .................. B23P 13/04; B23B 49/00; B23C 9/00

[52] U.S. Cl. ........................... 29/558; 408/13; 409/132; 409/147; 409/193

[58] Field of Search .............. 29/558, 26 A; 408/3, 408/4, 10, 13, 12, 147, 149, 150, 197; 82/1 C; 409/131, 132, 293, 244, 133, 186, 187, 199, 193, 194, 147, 148; 33/185 R

[56] References Cited

U.S. PATENT DOCUMENTS

| | | | |
|---|---|---|---|
| 3,124,976 | 3/1964 | Pittwood | 408/13 X |
| 3,171,327 | 3/1965 | Williamson | 409/187 |
| 3,254,548 | 6/1966 | Gersch | 408/10 |
| 3,279,285 | 10/1966 | Ivins | 29/558 X |
| 3,285,101 | 11/1966 | Klingel | 409/232 |
| 3,434,375 | 3/1969 | Clashausen | 408/147 |
| 3,481,247 | 12/1969 | Hayes | 408/135 |
| 3,526,159 | 9/1970 | Robinson et al. | 408/147 |
| 3,566,506 | 3/1971 | Wolf | 33/185.1 |
| 3,578,868 | 5/1971 | Wopkemeier et al. | 33/105 |
| 3,614,909 | 10/1971 | Neuser | 29/558 X |
| 3,636,814 | 1/1972 | Esch | 409/80 |
| 3,676,935 | 7/1972 | Klausing | 33/185 R |
| 3,700,345 | 10/1972 | Schubert | 408/150 |
| 3,715,167 | 2/1973 | Ollearo | 408/197 |
| 3,727,493 | 4/1973 | Lahm | 82/1 C |
| 3,899,724 | 8/1975 | Colton | 408/13 |
| 4,018,113 | 4/1977 | Blazenin | 409/80 |
| 4,055,386 | 10/1977 | Cynoweth et al. | 408/13 |
| 4,118,139 | 10/1978 | Lemelson | 408/12 |
| 4,151,642 | 5/1979 | Holland et al. | 33/185 R |
| 4,204,782 | 5/1980 | Spits et al. | 408/3 |
| 4,289,431 | 9/1981 | Berstein | 408/13 X |
| 4,326,824 | 4/1982 | Lasermann et al. | 409/132 |
| 4,354,305 | 10/1982 | Plummer | 29/568 |
| 4,400,118 | 8/1983 | Yamakage et al. | 408/13 X |
| 4,416,569 | 11/1983 | Yamakage et al. | 408/4 |

FOREIGN PATENT DOCUMENTS

| | | | |
|---|---|---|---|
| 43920 | 1/1982 | European Pat. Off. | 408/13 |
| 1548326 | 7/1970 | Fed. Rep. of Germany | 408/13 |
| 2030870 | 12/1970 | Fed. Rep. of Germany | 408/149 |
| 1333684 | 7/1963 | France | 408/147 |
| 2123272 | 9/1972 | France | 408/13 |
| 13126 | of 1915 | United Kingdom | 409/199 |
| 124865 | 4/1919 | United Kingdom | 408/147 |
| 629040 | 1/1977 | U.S.S.R. | 408/13 |
| 659,289 | 4/1979 | U.S.S.R. | 82/1 C |

Primary Examiner—William R. Briggs
Attorney, Agent, or Firm—Weingarten, Schurgin, Cagnebin & Hays

[57] ABSTRACT

A machine tool system having an adjustable implement mounted in a holder or chuck and moveably positioned relative to a moveable workpiece support, wherein implement adjustments are produced by controlled differential motion between the implement holder and an adjustment fixture on the workpiece support. The support is moved to engage the implement in the fixture, from which state further relative movement unlocks an implement clamp and produces a desired adjustment in the implement. Typical implement adjustment applications would include setting of a boring bar cutting radius (or setting of a measurement gauge dimension). The adjustments can be performed open loop based on prior calibration of implement adjustment versus extent of support motion, or closed loop wherein an initial cut (or measurement) is made by open loop implement adjustment with subsequent adjustments based upon a measurement made of the implements effective cutting (or measurement) dimension. Desired incremental changes in cut (or measurement) dimensions are then effectuated through corresponding incremental support motion. Closed loop mesurement and adjustment iterations largely overcome implement dimension errors due to rechucking, thermal drifts, machine motion position offsets, implement or contact point phenomena effects, speed-related dynamic distortions, gradual implement/wear and implement/workpiece force compliance. These measurements for iterative adjustment can be made with manual or automated gauging systems, either separate or integral to the machine adjustable implement system. The implement adjustment mechanism can be provided with a substantial mechanical advantage to correspondingly increase accuracy in implement adjustment.

8 Claims, 20 Drawing Figures

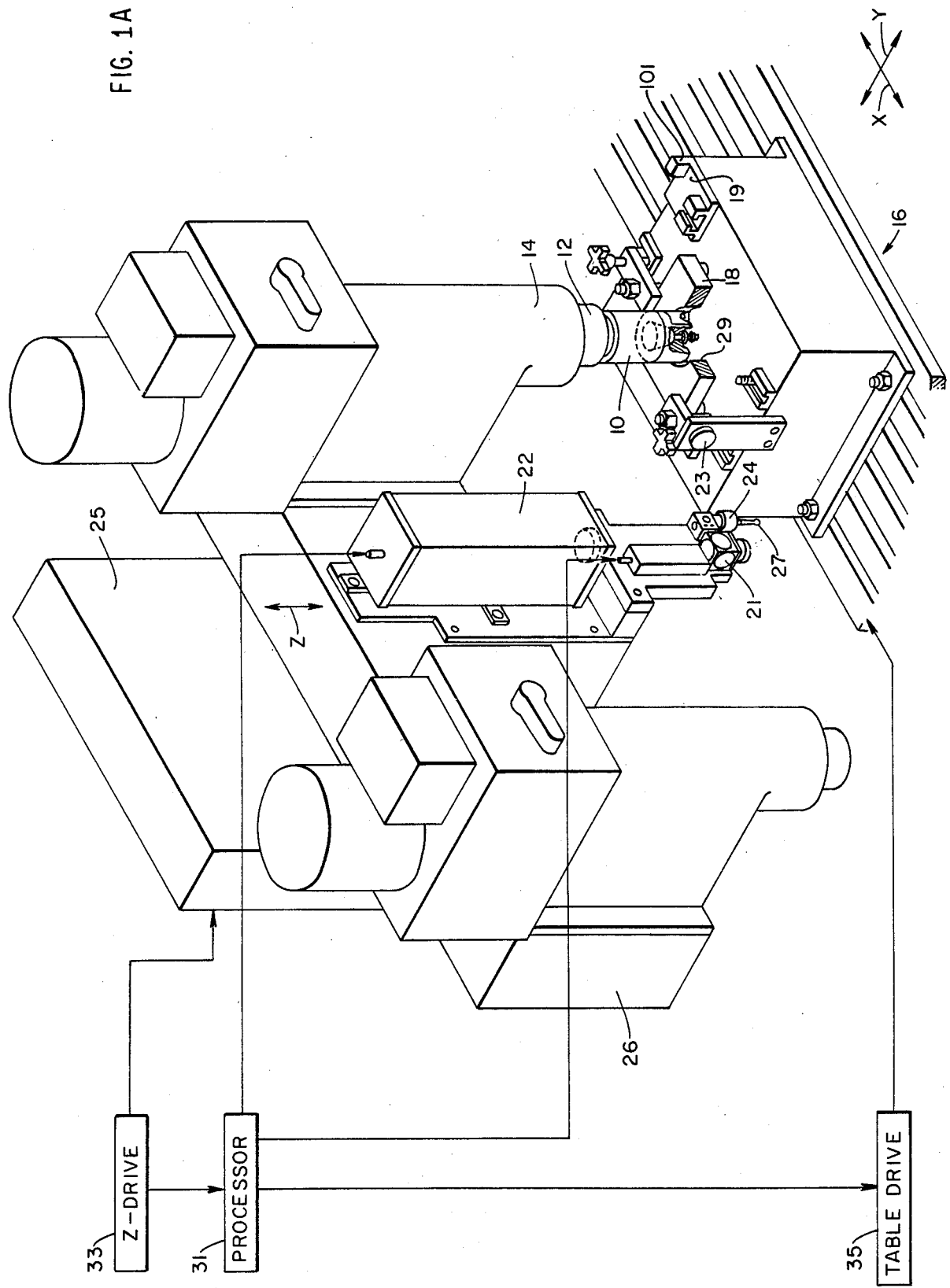

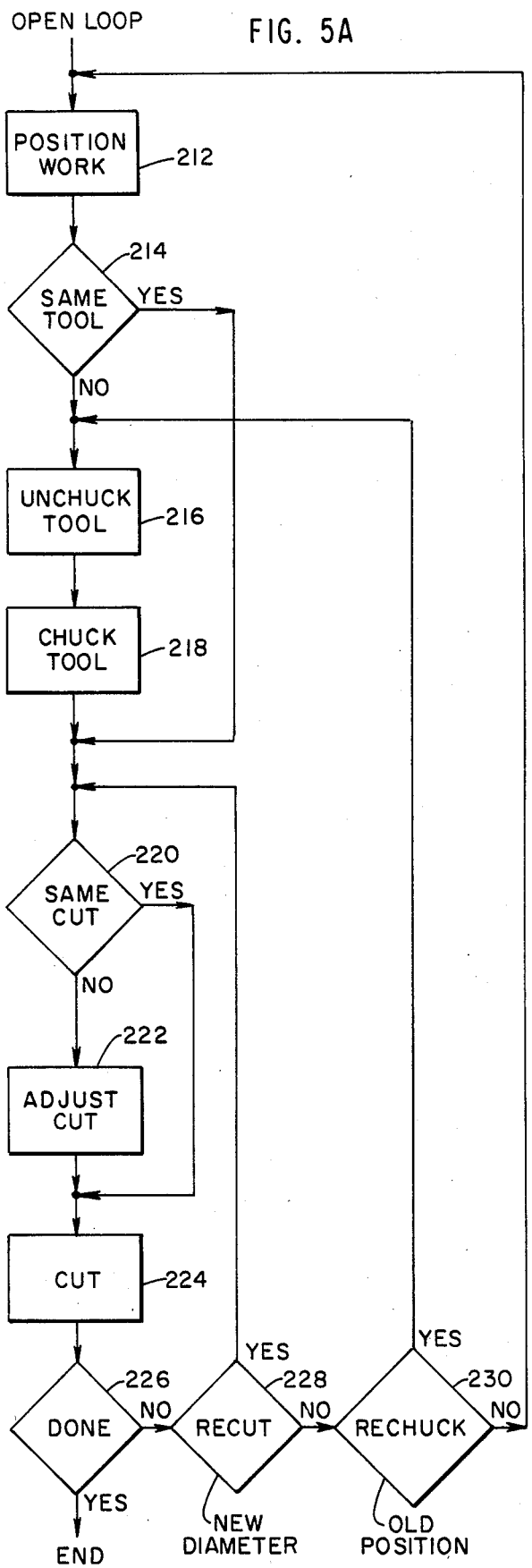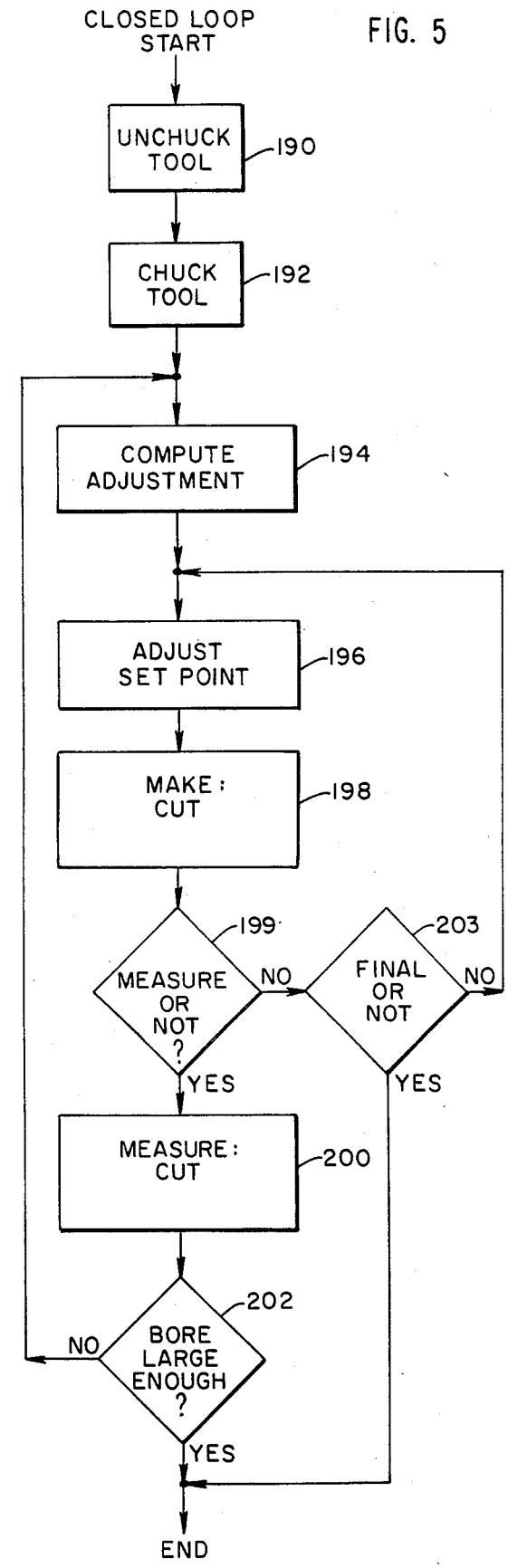

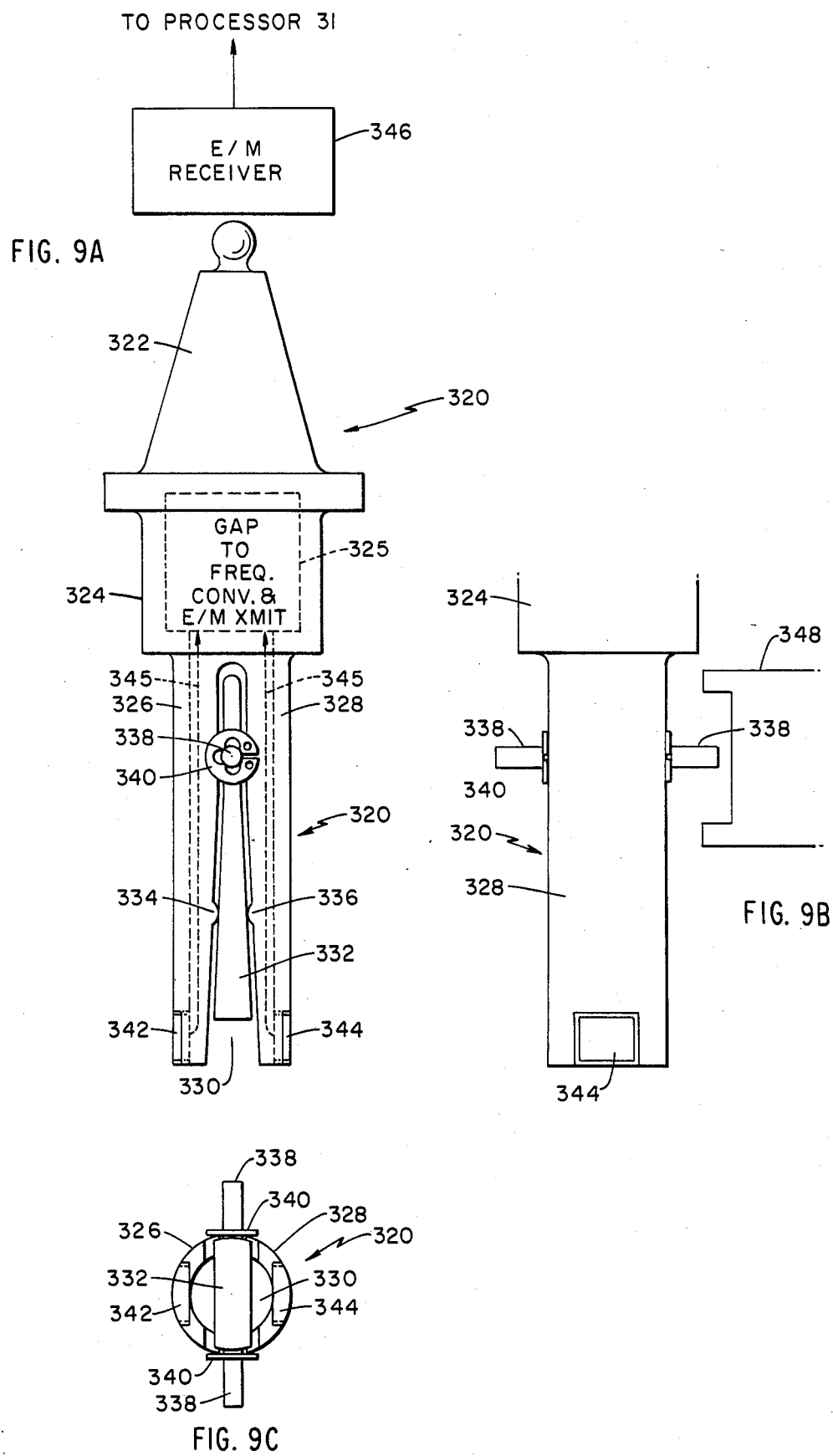

ADJUSTABLE MACHINING SYSTEM AND IMPLEMENT THEREFORE

FIELD OF THE INVENTION

The present invention relates to machine tool equipment, and in particular, to machine tool systems having adjustable implement.

BACKGROUND OF THE INVENTION

Precision boring, typically with a diameter tolerance of less than 0.001 inch, is a generally costly and difficult operation, not easily adapted to production line or high efficiency use. The difficult nature of such machining operations arises from several error sources which significantly affect the accuracy of such boring processes and are inherent in such operations as previously practiced. One major area of such errors results from the difference between the static measurement of tool boring diameter and the actual bore which the tool produces in operation. Such differences can result from many factors including wear and contamination of the cutting surface both before and during a cut, the varying nature of the materials forming the cutting surface, as well as the materials which define the overall tool rigidity and run-out error. The nature of the workpiece can have a significant effect in the variation of actually produced bore diameter. The temperature of both the cutting tool and the workpiece will affect the resulting bore. A second major area of difficulty results from errors attributable to rechucking of a machining tool in the drive spindle. These rechucking errors are due in part to variation in the relative position of tool and spindle, variations in local surface geometry of tool and spindle, variations in drawbar pull as well as the presence of contaminants between chucking surfaces.

In one type of high accuracy boring operation a plurality of passes through the same bore are produced to achieve gradually increasing bore diameters toward a finaly desired diameter. For each pass of increased diameter, a minimum amount of material must be removed in order that the cutting edge can operate below the region of surface hardening. Thus an accurate finished cut can not be made by a process of very small increments. The final machining pass must remove substantial material and its ultimate accuracy subject to some uncertainty. Rejection rates for final bores can thus be high.

Some of these inefficiencies can be avoided by gauging the bore after each pass to determine its actual diameter and, using an adjustable boring tool, make an adjustment to the tool based upon the desired increase in bore diameter. Such operations are still undesirably slow, involving time consuming man-machine interactions that interrupt production line activity and subject the adjustment procedure to operator error.

SUMMARY OF THE INVENTION

In the present invention an adjustable implement is held by a machine tool and operated thereby for cutting or gauging operations. The motions of the machine tool are utilized to produce implement adjustment in an open or closed loop to improve both accuracy and efficiency.

In accordance with one embodiment of the present invention, an adjustable machining system is provided in which an adjustable cutting tool, such as a hole boring tool, is mounted on a rotating spindle above a moveable workpiece support. The cutting tool includes an adjustment mechanism which may selectively engage a fixture on the support to permit adjustment of the cutting radius dimension in an adjustment procedure using a precise combination of machine axis movements of the support relative to the cutting tool.

In closed loop operation, the amount of table motion required to achieve a desired next cutting radius is determined from gauging the prior cut, the dimension of which was set using the fixture adjustment procedure. The amount of additional material to be machined from the workpiece is used to establish a predetermined motion that achieves an incremental change in the position of the cutting edge of the tool referenced to the same table coordinates that set the tool initially. In this manner, the errors resulting in the difference between static measurement of tool cutting characteristics versus actual dynamic cutting as well as rechucking errors are completely avoided while at the same time production efficiency can be improved by automating the adjustment of the tool to achieve a final, finished cut of desired dimension with great accuracy.

In open loop operation, the cutting tool is adjusted without the use of iterative measure, adjust and cut steps. The tool while engaged in the fixtures is instead adjuted by a support motion calculated to produce a desired cutting radius. The correlation between cutting radius and support position is previously established. Open loop performance will not normally achieve the same great accuracy of closed loop operation, typically in fractions of a thousandth of an inch.

The use of support motion to effect tool adjustment in the open loop mode relates tool cutting radius to the more easily controlled and monitored motion of the support through its automatic or manual positioning system and therefore simplifies adjustment procedures and reduces the chance for operator error. Open loop operation also improves efficiency by speeding up the machining sequence.

In one preferred embodiment the cutting tool comprises a boring bar. The bar is chucked in a rotating spindle and driven against a workpiece contained on the moveable support. The cutting tool will produce a bore of a diameter corresponding to the location of a cutting tip positioned about the lower periphery of the boring bar. Adjustment of the tool is provided by affixing the cutting tip to a collar which mates with the shank of the cutting tool and is rotatable about an axis slightly eccentric to the axis of rotation of the spindle. A spring loaded locking mechanism provides a force holding the collar to the shank in a manner to secure it during boring by the tool. The securing mechanism in one embodiment is accessable at the bottom of the tool with a handle which is engagable by the fixture on the support to release the collar and permit its rotation about the shank. Rotation of the collar is induced by driving a stop on the support fixture against a pin or edge of the collar to produce the predetermined collar rotation that, due to the off-axis collar positioning, changes the cutting radius of the tool accordingly. A high mechanical advantage included in the securing mechanism permits release of the collar by applying to the handle a releasing force which is only a fraction of the force securing the collar to the shank. This avoids high release forces that might disturb the chucking of the tool.

With a boring tool initially chucked in the spindle, the tool is engaged in the support mounted and driven fixture where a sequence of precise motions adjusts the tool to a predetermined cutting radius, significantly less than the finished radius desired. The bore in the workpiece is then made, or enlarged, with this adjustment of the tool and its actual diameter after boring is determined by manual, or automatic, gauging means. Using a known relationship, the difference between the actual bore and the desired finish, or next bore size in a multibore process, is converted to a corresponding support fixture position that achieves adjustment of the tool to a cutting radius which will produce the new bore size. The tool is then re-engaged in the fixture and the adjustment locking mechanism is unlocked by relative motion of the tool spindle and support. The support is again driven a specified amount to produce the corresponding increment in cutting radius. The adjustment mechanism is then relocked by support motion so that the cutting radius is securely fixed in place. The workpiece is then positioned below the adjusted tool and the bore enlarged in accordance with the new tool cutting radius. This achieves an expanded bore diameter, free of rechucking errors and in which the adjustment is based upon actual dynamic cutting of the tool as opposed to static calibration. This insures a more accurate and repeatable precision boring operation to any desired bore diameter within the range of the tool, on an automated basis compatable with high efficiency demands such as in production lines.

The movement of the workpiece support may be accurately controlled using standard position drives and associated gauging techniques normally found in machine tools. For use in a high accuracy, closed loop machining system a laser interferometer can be provided to insure a measurement accuracy consistent with the high precision capability of the present invention. Bore diameter gauging is typically achieved by precision contact sensors which engage the bore and measure its edge-to-edge diameter under controlled motion of the support. The support motion between opposite edge contacts is determined from the support drive system or the separate interferometer where a more precise measurement is desired.

A boring bar of large adjustment range is provided as a feature of the invention to increase production line efficiency by increasing the range of bores that can be accommodated by the same number of tools in the system holder. For the same boring operation, the number of tools used is reduced, also reducing the frequency of rechucking needed.

According to another embodiment of the present invention, the adjustable implement includes a measurement gauge of a mechanical, electrical, or electromechanical type having a physical or electrical adjustment in its gauging elements. This allows calibration of the gauge or, where desired, operation of it with a linear range for the gauge. In the latter case, the gauge is typically adjusted by a support mounted fixture such that the dimension being gauged falls within a specified range over which the gauge elements are linear in operation. In the former case, the adjusted gauge is first applied to sense a reference dimension from which its operation is calibrated according to a known relationship between gauge output and dimension.

In either embodiment of the invention, the implement adjustment operation typically involves an unlocking and locking function as well as an adjustment function. These are typically separate functions produced by independent and orthogonal relative motions between implement and support mounted fixture. On a machine tool, three independent (X, Y and Z) translation motions are available to achieve these functions. Where necessary, or desirable, a rotation can be added or substituted as a motion available to achieve one or both functions or add an additional dimensional control.

The implement adjustment is typically provided by either a lateral motion or an eccentric rotation of an implement element.

Different embodiments of the present invention utilize various geometries of implement adjustment to allow a significant range of mechanical advantage. The forces required by the adjustment and locking function are reduced to a small percentage of the forces normally developed within the implement when the cutting tool engages the workpiece.

Different locking mechanisms are employed according to the differing clamping strengths desired. Two such mechanisms include a direct loading of cone-shaped clamping surfaces by Belleville spring washers, and rotational compression across the clamping surfaces by a spring-loaded screw. In embodiments where clamping forces are orthogonal to machining forces, lateral friction clamps are used.

The present invention is capable of use with cutting and gauging implements in various additional system applications such as workpiece gauging, sensing, forming, reaming, milling and other production, machine processes.

BRIEF DESCRIPTION OF THE DRAWING

These and other features of the present invention are more fully described in the following detailed description and in the accompanying drawing in which:

FIG. 1A shows a pictorial diagram of a machine tool system according to the present invention in a machining mode;

FIG. 5 is a flow chart showing a typical closed loop machine system operation sequence according to the invention;

FIG. 5A is a flow chart showing a typical open loop machine system operation sequence according to the invention;

FIG. 9A shows a side view of an adjustable measurement gauge according to the present invention;

FIG. 9B is an orthogonal side view of the gauge of FIG. 9A; and

FIG. 9C is a bottom view of the gauge of FIG. 9A.

DETAILED DESCRIPTION OF THE INVENTION

The present invention contemplates a machine tool system and a machining tool or dimension sensing gauge therefore adjusted by a fixture on a support table for the workpiece. The fixture selectively engages an adjustment mechanism of the tool or gauge while it stays chucked and uses system drive motion to effect the desired adjustment. Adjustment may be open loop using previously determined relationships between system drive position and tool or gauge adjustment or closed loop in which case operation includes one or more initial tool cuttings or gaugings, dimension sensing, tool cutting or gauging characteristic adjustment and one or more finish cuts. In closed loop operation the adjustment is made as an incremental system drive of the fixture relative to the tool or gauge after measurement, calculated, by automatic or manual means, to achieve a desired increase in resulting tool cutting or gauge reference point.

Figure 1B:
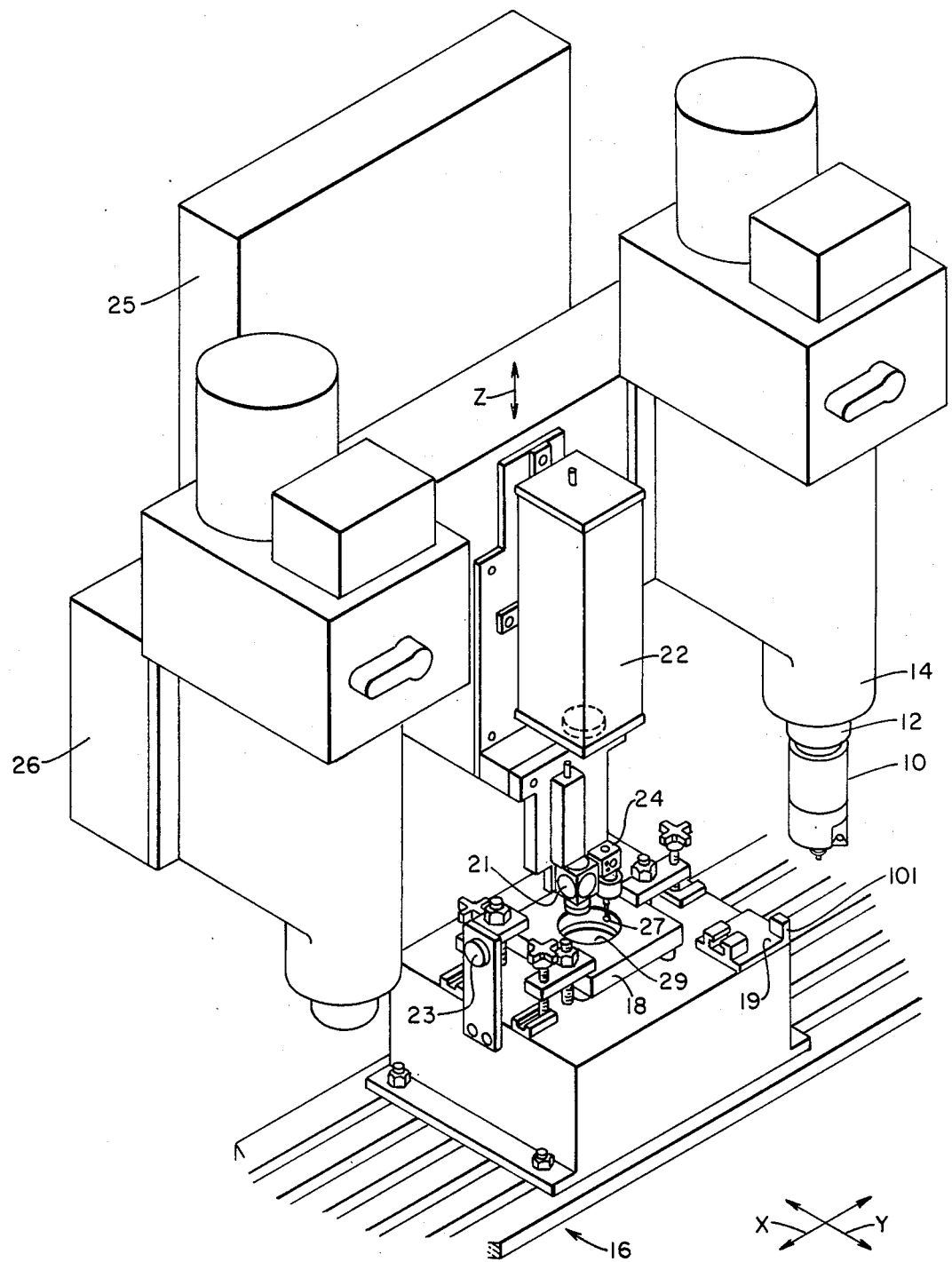
FIG. 1B shows the pictorial diagram of the embodiment of FIG. 1A in a measurement mode.
Figure 1C:
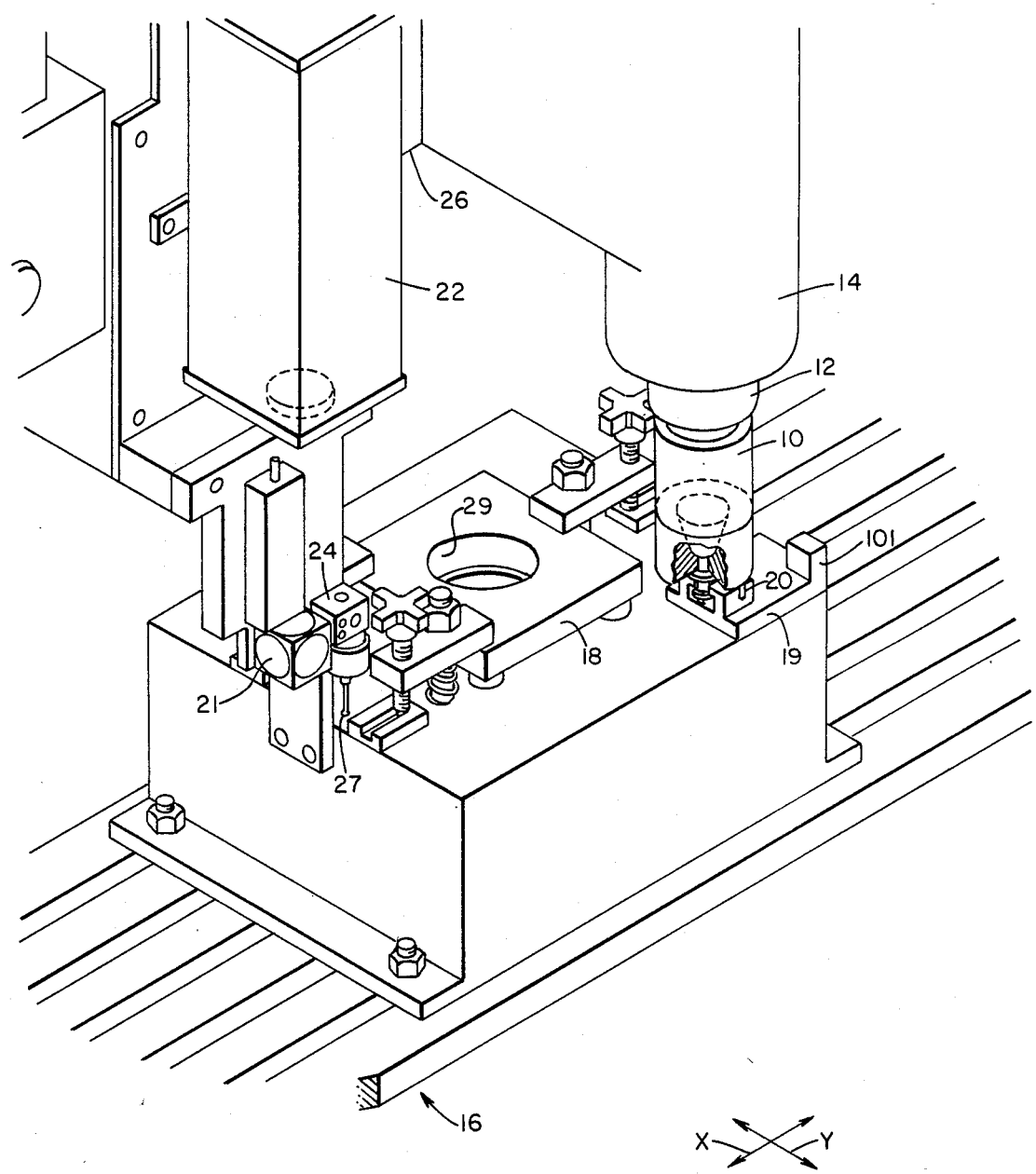
FIG. 1C shows the pictorial diagram of the embodiment of FIG. 1A in a tool adjustment mode.

In the application of the invention to a hole boring system, a typical machine tool system boring center is shown in FIGS. 1A, 1B and 1C, each showing the system in these different modes of operation. In FIG. 1A, the boring center includes a boring tool 10 shown engaging a workpiece 18. The boring tool 10 is retained by a chuck 12 which is rotated by a spindle 14 mounted to a saddle 26 vertically movable by drive 33 in the Z axis direction along a guide 25. The spindle 14 is of the type, known in the art, which can be stopped at a selected orientation of the implement chucked in it, as for example by using a servo drive. The workpiece 18 cut by the boring tool 10 is supported and retained on a support table 16, movable in orthogonal lateral X and Y axis directions by drive 35, enabling the boring center to have three-dimensional (X, Y and Z) adjustment of the tool 10 relative to table 16.

After a bore 29 is made, the table 16 and the saddle 26 together move to reposition the workpiece 18 close to arm 27 of a contact sensor 24 as shown in FIG. 1B, in order to gauge the diameter of the bore 29. The exact position of the workpiece 18 relative to the sensor 24 maybe determined by detecting the amount of motion produced by drive system 35. For highest accuracy, however, this position information is provided by a laser interferometer 22 which includes a right angle reflector 21 mounted to the saddle 26 and a retroreflector 23 mounted to table 16. Laser interferrometers of this nature are known in the art. In this particular embodiment, the sensor 24 comprises a contact sensor, such as a Renishaw sensor and measurement of the bore dimension is performed by moving the table 16 laterally between points of contact by arm 27 of the sensor 24 on the inside walls of bore 29. The bore dimension is then derived from the table displacement produced by drive 35 under control by a processor 31, or as detected by laser interferometer 22 in conjunction with processor 31. In the former case the amount of table motion is identified by the number of drive pulses applied to the stepping motors of table drive 35. In the latter, the number of interference fringes identifies table motion.

Adjustment of the boring tool is illustrated in FIG. 1C, wherein table 16 is driven in association with saddle 26 to engage the boring tool 10 with an adjusting fixture 19, mounted on table 16. After the tool 10 and fixture 19 are engaged, the cutting diameter of the tool 10 is adjusted by driving the table 16 a distance which is a function of the amount by which the cut diameter of bore 29, measured in the step associated with FIG. 1B, is to be increased.

Generally, the boring tool cut diameter is adjusted by lateral movement of the boring tool against a stop associated with fixture 19 by appropriate displacement of the table 16 according to a predetermined calibration relationship between changes in cutting diameters and lateral displacement of the table 16, discussed below. Where fully automated operation is intended, this relationship is contained within processor 31 which controls the drives 33 and 35 that position saddle 26 and table 16. The amount by which the bore diameter is to be increased is converted to a predetermined table motion by processor 31 using this relationship. The processor 31 then activates drive 35 to produce this table motion and a predetermined saddle 26 motion then locks the tool at the adjusted bore diameter. The relationship between displacement of the table 16 and boring tool adjustment may be changed in processor 31 to accommodate different drives and tools. Motion control can be by the structure inherent in the drive systems 33 and 35. Following the tool adjustment described above, the table 16 is moved to allow the workpiece 18 to re-engage the boring tool 10 to make the next or finishing cut in the manner described above in conjunction with FIG. 1A.

In a typical operation sequence an initial or a semifinished boring operation is performed, leaving appropriate material for removal in subsequent or finish boring. The adjustable boring tool is then secured in chuck 12 and its bore diameter is adjusted by fixture 19 to a preselected dimension which is utilized to produce a preliminary finish bore removing approximately half of the remaining material to the specification diameter. The bore is then typically cleaned of debris. The preliminary finish bore is then gauged by arm 27 on sensor 24. This establishes a precise relationship between bore diameter and tool adjustment in terms of the drive position at fixture 19 used to establish the cutting radius for this semi-finished bore. The desired increase in bore diameter for the finish bore can then be very accurately made as an increment to the prior adjustment of the tool. This closed loop adjustment eliminates all errors associated with rechucking and other tool uncertainties. Open loop operation as more fully set forth below is also possible.

Figure 2A:
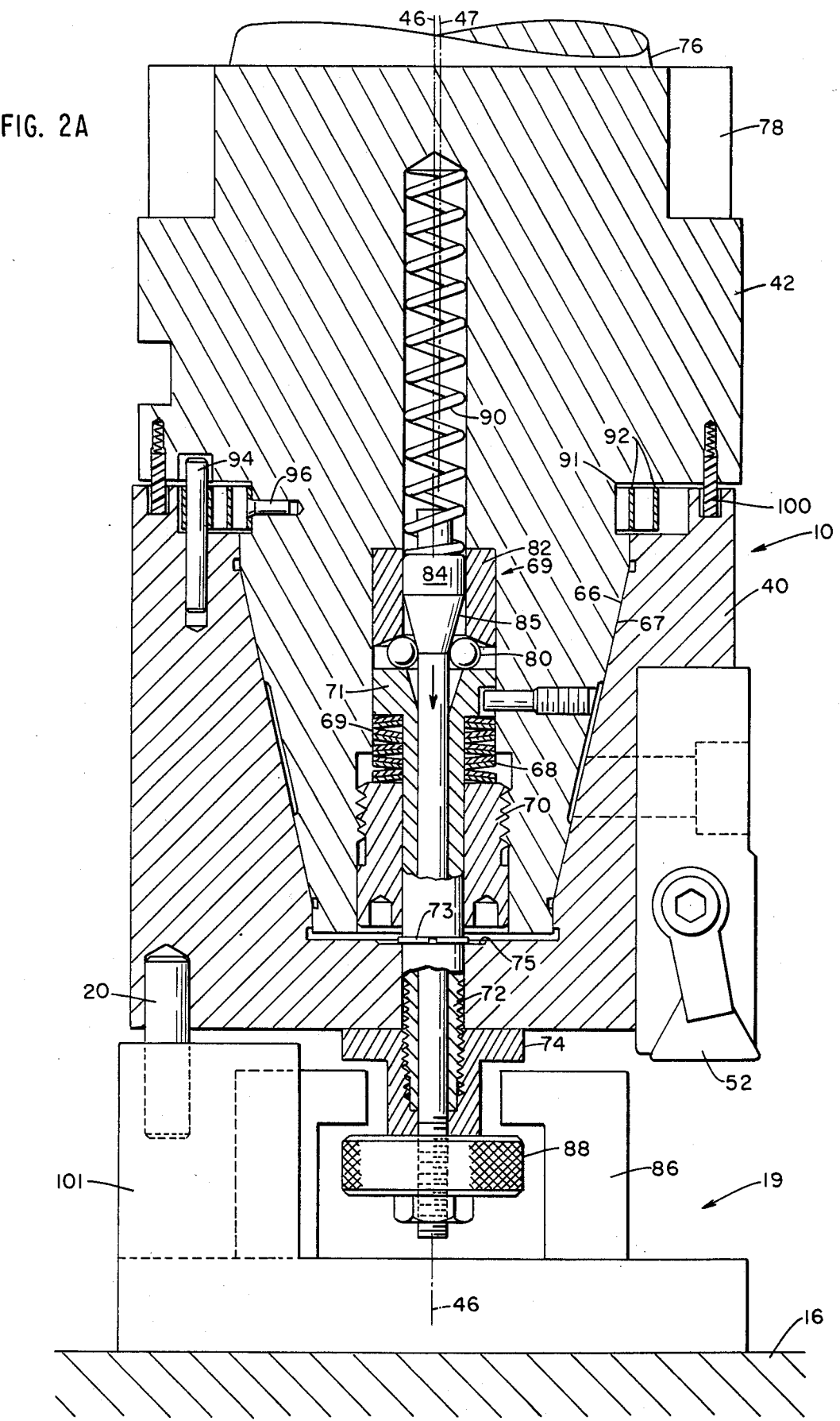
FIG. 2A is a cross-sectional view of one embodiment of an adjustable boring tool for use in the machining system with the cutting edge in a secured condition adapted for cutting.
Figure 2B:
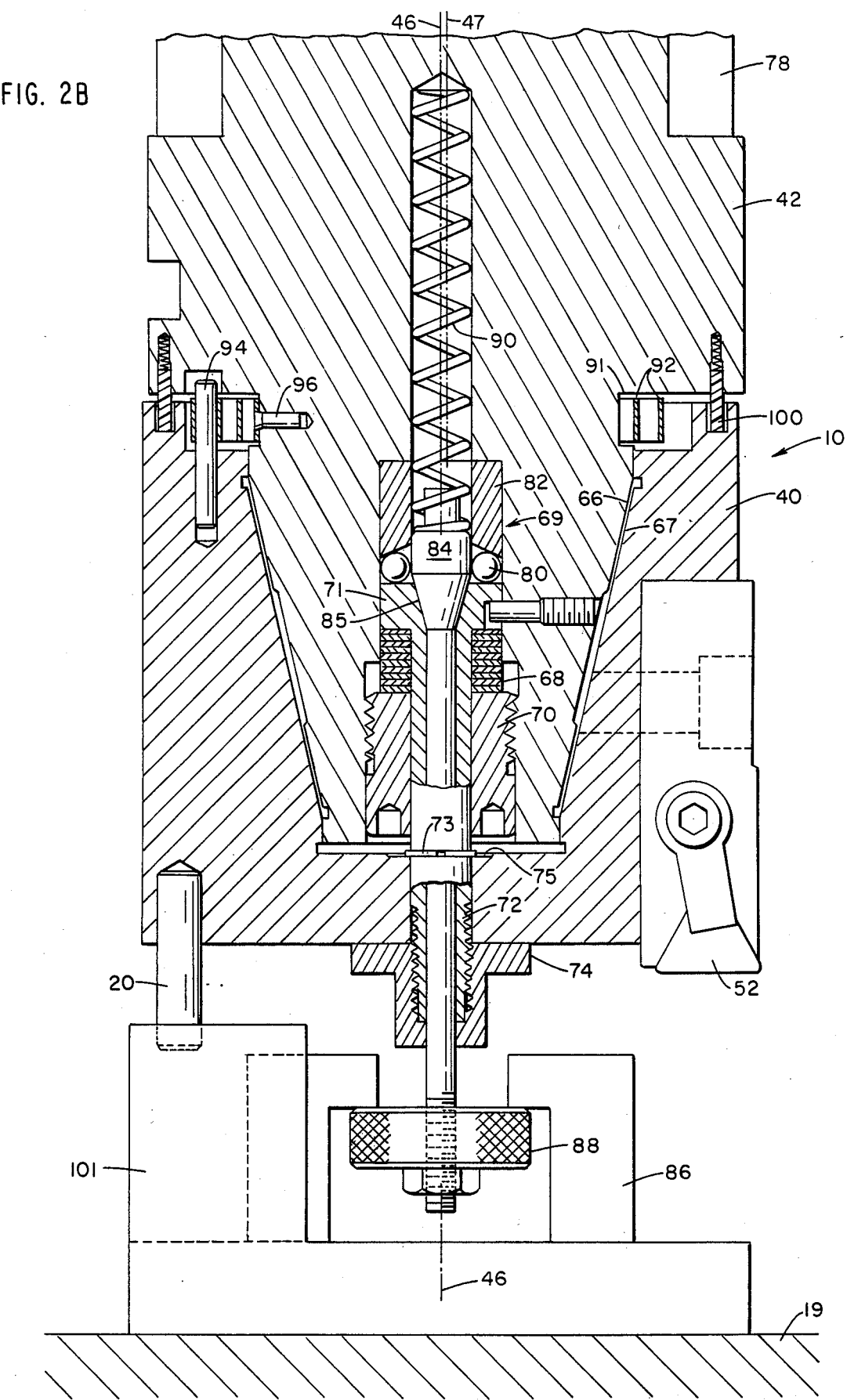
FIG. 2B is a cross-sectional view of the tool of FIG. 2A with the cutting edge released for adjustment.
Figure 3:
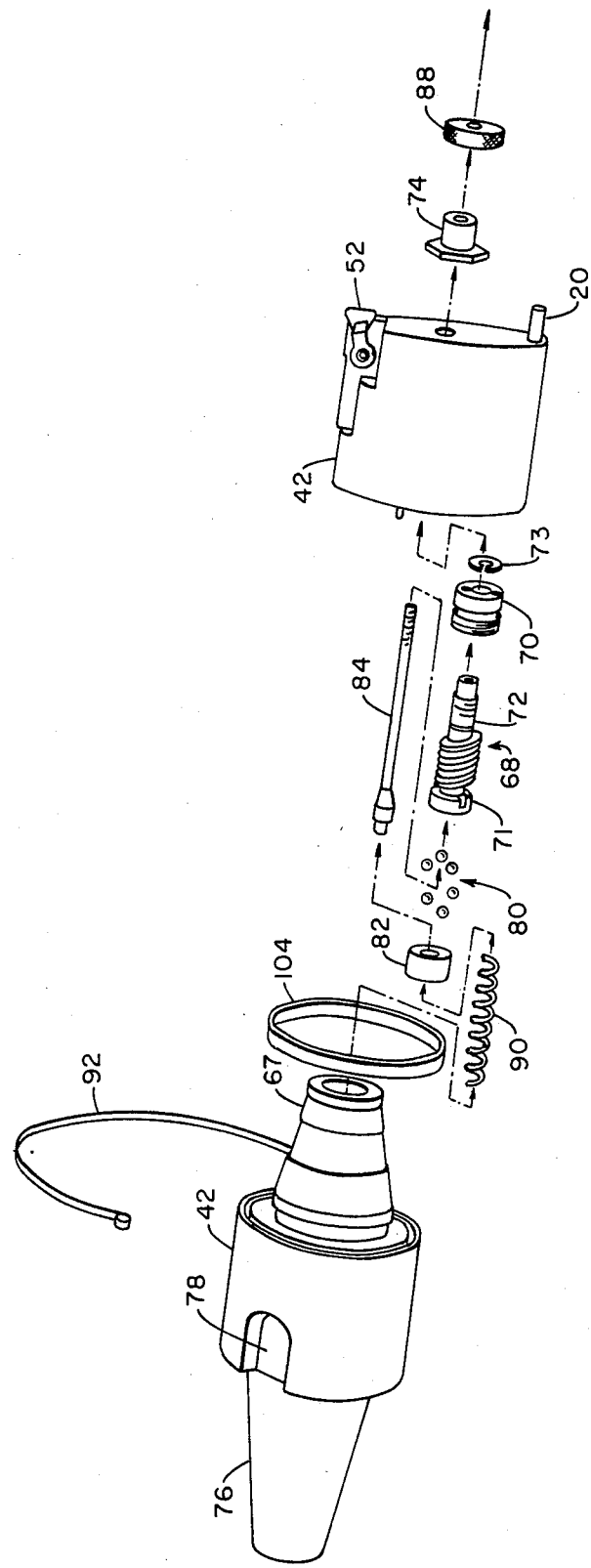
FIG. 3 is an exploded view of the tool of FIGS. 2A and 2B.

One embodiment of a boring tool according to the present invention is shown in FIGS. 2A and 2B which details the releasable clamping mechanism used to permit adjustment of the cutting radius. FIG. 3, provides an exploded view of the tool elements of FIGS. 2A and 2B. The boring tool has a cutting tip 52, which performs the material removal machining of the workpiece, and which is affixed to a rotatable collar 40 axially disposed on a tool shank 42. The tool shank 42 is driven by the machine tool system of FIGS. 1A, 1B and 1C by engagement of a tapered end 76 and key-way 78 of the shank 42 in machine tool chuck 12.

The shank 42 mates with collar 40 through respective male and female tapered surfaces 66 and 67 which when urged against each other transfer cutting torque from shank 42 to the collar 40. The tapers magnify the clamping force to produce a higher holding torque which resists slippage under machining forces.

A clamping spring 68 provides an axial clamping force on the tapered surfaces 66 and 67 which firmly couples collar 40 and shank 42. For this purpose, the spring 68 is retained in a recess 69 between an apertured screw 70 which is inserted into threaded end portion of recess 69 and an inner shoulder 71 of an axial retaining sleeve 72. Sleeve 72 extends through the apertured screw 70 to a nut 74 on the bottom of collar 40 in order to transfer the compression force of spring 68 to the facing tapered surfaces 66 and 67, respectively.

The spring 68 shown in FIGS. 2A and 2B is compressed to release the collar 40 from the shank 42 for rotational adjustment by forcing a set of ball bearing balls 80 between a tapered rear collar 82 and the shoulder 71 of the axial retaining sleeve 72, forcing it forward along an axis 46. Clip ring 73 is secured around sleeve 72, and resides in a recess 75 of collar 40. Ring 73, has an outer diameter greater than sleeve 72 so that forward axial motion of sleeve 72 urges collar 40 forward thus releasing the compression force between the surfaces 66 and 67. The resulting separation is shown in FIG. 2B.

The balls 80 are forced between collar 82 and shoulder 71 by forward motion of an axial release pin 84 inserted through sleeve 72 and having an inclined inner surface 85 which, when moved forward, pushes the balls 80 outward between the rear collar 82 and the collar 71 on sleeve 72.

An external nut 88 is screwed onto the outer end of axial release pin 84 to permit the release pin to be actuated by sliding it into a T-slot clip 86 on the table mounted fixture 19. The clip 86 engages the nut 88 and with upward motion of saddle 26 achieves the unlocking of the tapered surfaces 66 and 67 illustrated in FIG. 2B. The load on the release pin 84 to extend it is less than the oppositely directed force produced by the spring 68. The reduced force is provided by the increase in leverage formed by the gradual incline of inner surface 85 which permits its pin 84 to move axially through a greater distance than the axial motion that balls 80 transmit to the sleeve 72. This geometry results in less pull force on nut 88 than the compression force provided by springs 68 across tapered surfaces 66 and 67. This mechanical advantage produces a greater separation force between surfaces 66 and 67 than is exerted on the chucking taper 76 (FIG. 3) so as to avoid dislocation of the shank 64 in chuck 12. A rear spring 90 keeps the release pin 84 in its extended position during the resetting operation, when balls 80 bear on the cylindrical portion of pin 84, but is readily compressed by the forces acting when the balls 80 bear against the conical portion.

An axially concentric clock spring 92 resides within an annular cavity 91 between collar 40 and shank 42 and is secured at one end to collar 40 by pin 94 and at the other end to shank 42 by pin 96. The spring 92 exerts a restoring torque to rotate the collar 40, when released, to a reference position established by a collar stop pin 98 secured within shank 42 and travelling within a groove 100 of collar 40. The collar 40 is rotated against the force of spring 92 by table motion which drives an adjustment bar or stop 101 on fixture 19 against an adjustment pin 20 on the bottom of collar 40. The collar 40 is rotated through a predetermined angle as a result of an amount of table motion controlled by processor 31, based upon the stored relationship between table motion and increase in cutting radius with rotation of collar 40. Before each fixture generated adjustment the spindle is stopped, or driven to, the same reference position.

Figure 4A:
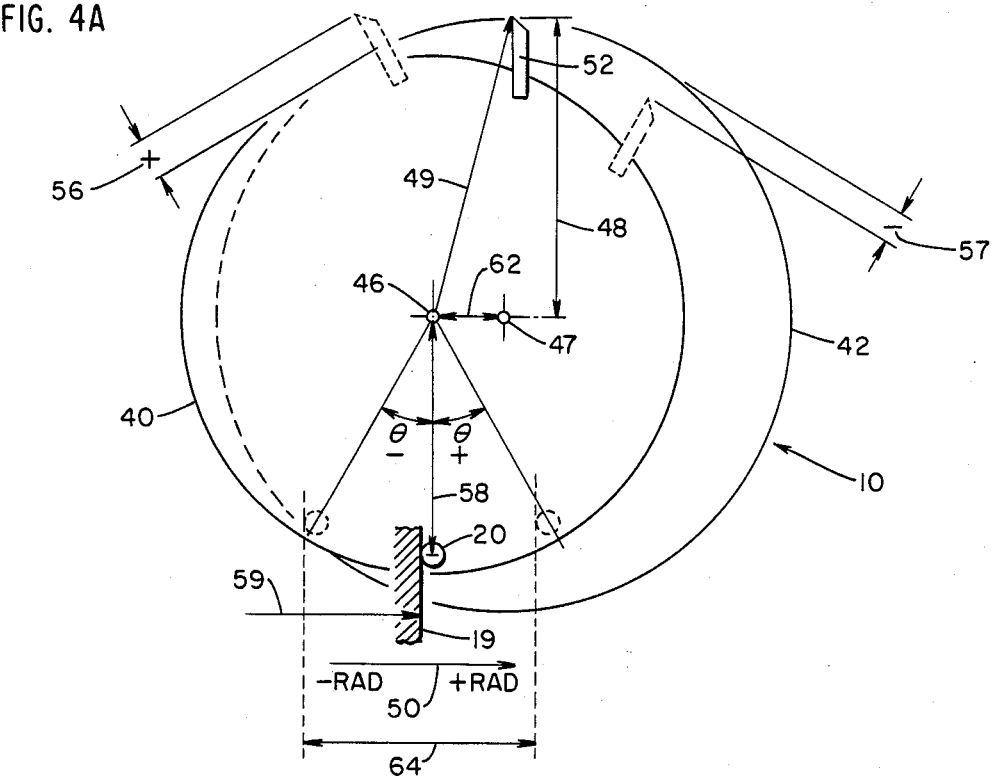
FIG. 4A is an end diagramatic view of an adjustable boring tool illustrating the adjustment feature of a cutting surface for use in the machining system.

As shown in FIG. 4A, a change in the cutting radius with rotation of the collar 40 results from the fact that the collar 40 rotates about an axis 46 on shank 42 which is displaced from an axis 47 of rotation of the shank 42 in the chuck 12 of spindle 14. The cutting tip 52 is set a fixed distance 49 from collar rotation axis 46 but will rotate about the shank rotation axis 47 at a radius 48 that varies with relative position of collar 40 and shank 42.

Figure 4B:
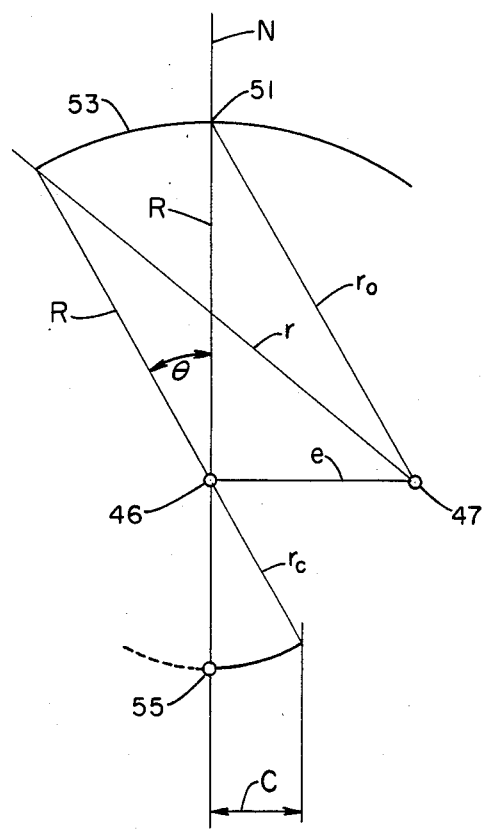
FIG. 4B shows the geometric relationship of adjustment of FIG. 4A useful in explaining the operation of the present boring tool.

The cutting radius may thus be varied positively or negatively through respective maximum distances 56 and 57. These distances are the relative changes in cutting radius from a "center" position in which the shank 42 and collar 40 are typically in line. Table motion, along a line 59, as noted above is used to generate $\theta$ rotation between shank 42 and collar 40. The adjustment along line 59 and the resulting rotation are related by a first trigonometric function. The rotation on angle $\theta$, the eccentricity 62, and the resulting cutting radius are related by a second trigonometric function. When these two trigonometric functions are taken together to express the change in cutting radius as a function of adjustment distance along line 59, a non-trigonometric relationship is formed and is shown with respect to the dimensions of the geometric drawing of FIG. 4B. Here the adjustment distance along line 59 is represented as a variable distance "C." The cutting tip is shown by a point 51, a fixed distance "R" from collar axis 46. When the collar is set at the "center" position, C is zero. The cutting tip at point 51 is defined at a distance "$r_o$" from shank rotation axis 47 and lies on line N, normal to the line of known distance "e" between the shank axis 47 and the collar axis 46. As the pin at 20 represented by point 55, is moved laterally, changing the distance "C", the cutting tip at 51 moves through an arc 53 and the cutting radius increases from "$r_o$" to "r". From these parameters, the following relationship can be obtained:

$$C = \frac{r_c[2r_o(r - r_o) + (r - r_o)^2]}{2Re} = \frac{r_c(r^2 - r_o^2)}{2Re}$$

Where $r_c$ is the distance between point 55 and axis 46. This relationship becomes a linear approximation when $(r - r_o) << r_o$. That is, for small changes in radius, independent of starting point $r_o$, small changes can be made according to a direct linear proportionality between change in cutting radius and table displacement.

In typical operation an initial bore is made by setting the distance C to a value calculated to produce this initial bore. The actual bore diameter produced is then measured and C is increased from the initial value to a final value by an amount obtained using the relationship. Because the initial C is known in the reference frame of the drive system or from the interferometer 22 measurements and because the actual cut it produces is measured, the change in C can be calculated and set into the boring tool to produce a high precision final cut.

The complete closed loop operational sequence of machining a workpiece according to the present invention is illustrated in FIG. 5.

The process illustrated in FIG. 5 typically commences at an initial state identified as START with a workpiece in place and processor 31 having the coordinates in memory for the location of a hole to be bored or enlarged in the workpiece. This initial set up can be automated or manual as described. The spindle 14 will typically have a boring bar 10 from a prior boring operation, which may involve a separate hole or a preliminary boring of the hole to be enlarged and finish cut.

From this START state, steps 190 and 192 will be used to unchuck the former tool and rechuck a new tool for the next boring operations where a new tool is to be utilized. Automated rechucking may be used for production line uses. If the same tool is to be used, steps 190 and 192 are skipped. With a rechucking operation as indicated by steps 190 and 192, the boring operation will be subject to both rechucking errors and tool cutting radius uncertainties. The remaining steps of FIG. 5 are directed toward reducing or eliminating these errors through one or more bore, measure and adjust loops.

Accordingly, a subsequent step 194 determines the tool adjustment, using the appropriate relationship noted above, in processor 31. This results in a predetermined rotation produced on collar 40 by driving the table fixture 19 block 101 against pin 20 a predetermined distance after clip 86 engages nut 88 to release surfaces 66 and 67 (FIGS. 2A and 2B). Step 196 executes this adjustment. Processor 31 stores the data reflecting the amount of table motion used for the adjustment.

At this point, the tool 10 has been adjusted, open loop, to an intended bore radius, but is subject to all the errors noted above. In subsequent step 198 the table 16 is repositioned to present the location to be bored on workpiece 18 under the tool 10 and the bore is made. This bore can be a non-final cut, and if so, the dimension is such that no portion of it can exceed any dimension of the final radius regardless of the system errors.

After the bore of step 198 is made, a decision step 199 controls further processing depending upon whether a measurement is to be made of the bore produced in step 198. In the case presently being described, decision 199 accordingly directs the sequence to a measurement step 200. In step 200, the interferometer gauging system is activated by driving table 16 to position workpiece 18 and bore 29 below finger 27 and, by then lowering the saddle 26, to place the finger 27 within the bore 29. Back and forth motion of table 16 is then produced between points of contact of finger 27 with the inner walls of bore 29 with the processor 31 noting the coordinates of the contact points. Known statistical averaging techniques may be used here. From this data the exact bore radius of the tool 10, is determined in the reference frame in which the table 16 is controlled by drive 35 and processor 31. The amount by which the tool 10 is to be expanded to produce the next bore can be calculated by processor 31 by use of coordinate data obtained from the previous adjustment, and the setting relationship. In effect the tool adjustment commands for the next specified bore radius in the cutting sequence, initially stored in processor 31, is an incremental rotation of collar 40 produced as an incremental table motion determined from the stored relationship noted above. This is accomplished in the FIG. 5 sequence by directing processing in a decision step 202 to loop back to adjustment computation step 194. Each adjustment is to produce a subsequent larger bore as stored in processor 31. The closed loop processing creates a subsequent cut in which tool rechucking and calibration errors as well as tool boring uncertainties have been cancelled, insuring a far higher precision to the next bore of step 198. The boring sequence stored in processor 31 may direct one or more loops back through steps 194–199 before a bore of the desired dimension is achieved. The occurrence of the correct bore size is typically identified in decision step 202 resulting in processing branching to the sequence END state which may commence a different hole boring sequence of the type illustrated in FIG. 5 or other processing as desired. The sequence stored in processor 31 may indicate a given bore in step 198 is not to be followed by a measurement step 200 in either a final or non final bore. In this case, the decision step will direct processing to a further decision step 203 to determine whether the previous bore was final or not. If not final, processing loops back through step 196, while if final branches to the END state.

Alternatively, decision step 202 may be utilized to exit the sequence after executing the measurement step 200 as a check on the bore dimensions actually achieved in the final or finish bore, instead of being used to redirect processing through another adjust and cutting sequence in steps 194–199 if the bore is below specification.

Open loop process is shown in FIG. 5A. The work is first positioned in step 212 and workpiece position information is stored in the processor 31 discussed earlier. If a tool is currently engaged by the chuck, and if it is to be used in the current operation, decision step 214 allows the system to skip to step 220; otherwise, the tool is unchucked at step 216 and desired tool chucked at step 218. When the desired tool is chucked in the machine, the bore may be made. If the existing bore radius of the cutting tool is to be used in the next cutting operation, the system skips to step 224, to perform the bore. Otherwise the cutting radius is adjusted according to step 222 before the bore is performed at step 224. If a single bore is all that is required, the decision step 226 will detect an end-of-run and terminate the system operation. If an additional bore is desired using the same tool, decision step 228 returns the system to the status immediately after the tool was chucked in step 218. Subsequent system decisions as described above may thereafter proceed. If a new tool is needed, decision step 230 returns the system to the step just before the tools are changed, in step 216. If a bore in another position is needed, and a new position must be located, such as boring several holes in one workpiece, the system begins again at step 212 to reposition the workpiece. These procedural steps may be manually or automatically performed by hand operation or machine control.

Figure 6B:
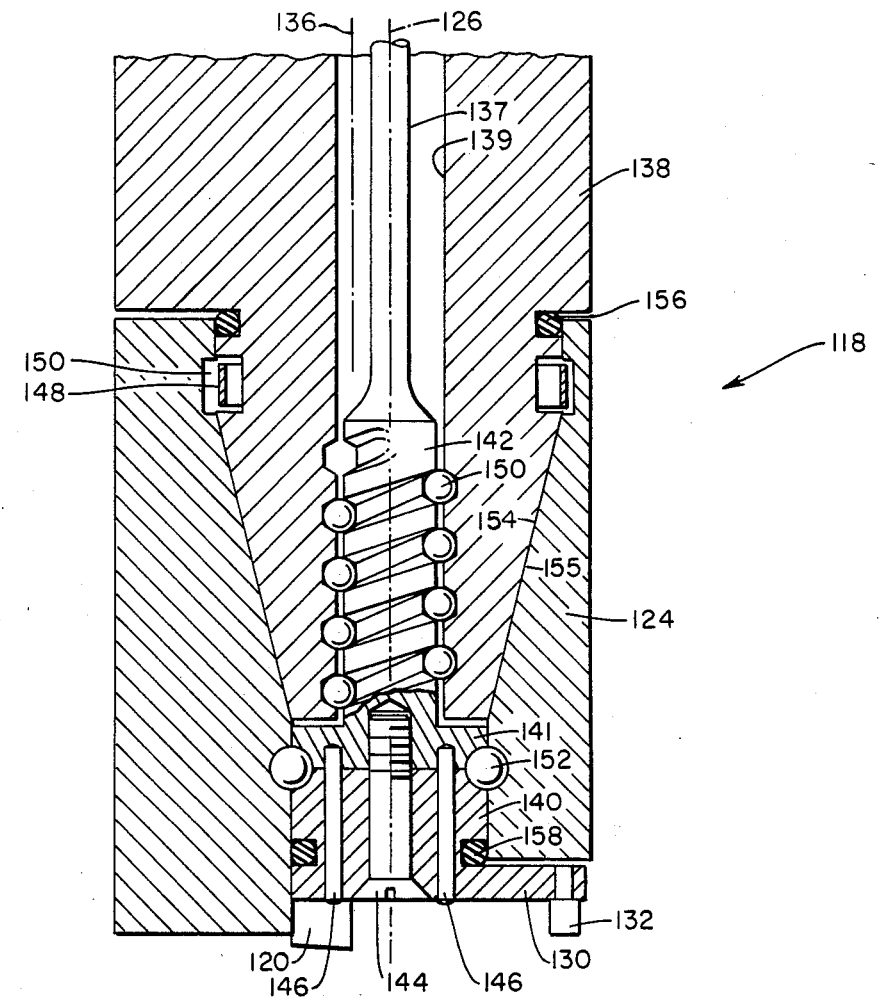
FIG. 6B shows a side cross-sectional view of the boring tool of FIG. 6A.
Figure 6A:
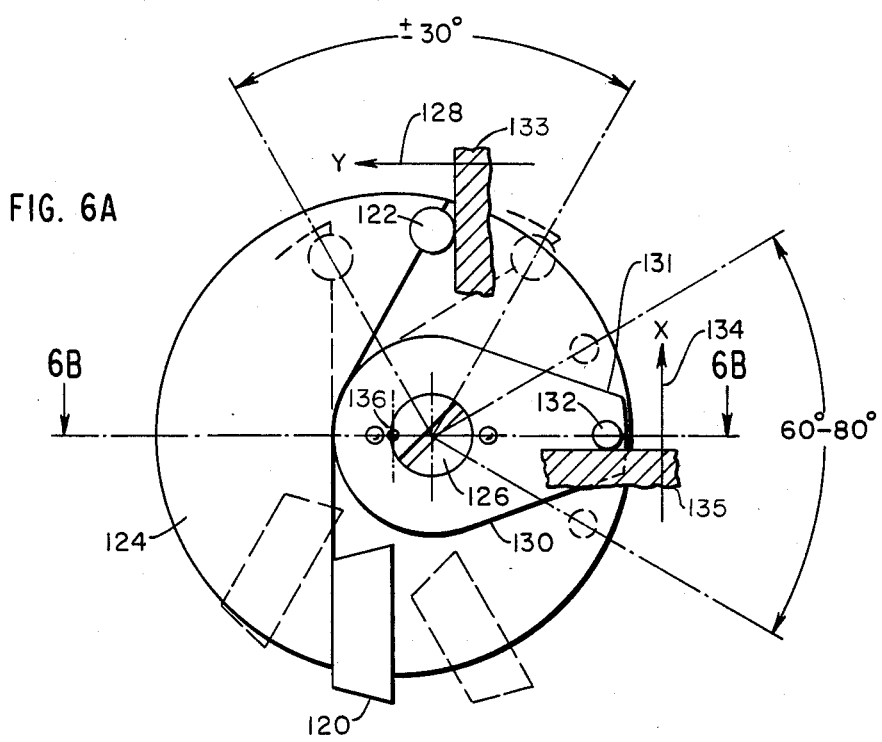
FIG. 6A shows an end view of an alternate embodiment of a boring tool according to the present invention.

An alternate embodiment of the boring tool is shown in FIGS. 6A and 6B, wherein the axially extending collar unlocking assembly of FIGS. 2A and 2B is replaced by an assembly in which the collar unlocking force and the cutting tip adjustment force are applied in the same plane, one orthogonal to the other. Specifically, a boring tool 118 in FIG. 6A, has a cutting tip 120 and an adjustment pin 122 retained on a collar 124 moveable about an axis 126 offset from the central axis 136 of shank 138. Adjustment is provided by applying a force against the adjustment pin 122 in a direction 128 to produce a rotational torque on collar 124 about axis 126.

The range of collar rotation is approximately ±30° about the axis 126.

The collar 124 is released from boring tool shank 138 to permit this adjustment by a locking assembly actuated by a planar lever 130 placed flat upon the end of collar 124. Lever 130 has an adjustment pin 132 extending outwardly parallel to the axis 126 at a tip portion 131. Release of the collar 124 is achieved by forcing pin 132 in the direction of arrow 134, over an approximate angle of 60°-80°. For convenience the directions 134 and 128 are chosen to correspond to the X and Y corrdinates typically available in machine tool equipment, and are independently adjustable without appreciable interference. In FIG. 6B, the cutting tip 120 is shown mounted on collar 124 which is retained by shank 138 of the cutting tool 118. A torsion bar 137, residing within a central bore 139 of shank 138, has on its end a threaded enlargement 142, the head 141 of which is connected to the adjustment lever 130 via a spacer 140. The other end is secured above to shank 138. Lever 130 is secured to the head 141 of the torsion bar 137 by a screw 144 passing through spacer 140. Torque from lever 130 is transferred to head 141 via alignment pins 146. The boring bar 118 also includes a clock spring 148 contained within slotted opening 150 within collar 124, operable in a manner similar to that described above with reference to the spring 92 of FIGS. 2A and 2B. The threaded end 142 of torsion bar 138 is grooved with a four point contact RH ball screw matching a similar helical groove on the portion of bore 139 in shank 138 facing threaded end 142. Four point contact ball bearings 150 are included in the helical channel defined between the grooves of the torsion bar end 142 and the bore 139 to form a minimal backlash bearing between the collar 124 and torsion bar 137. Ball bearings 152 lie between collar 124, head 141 and spacer 140 permitting downward motion of head 140 to be coupled to collar 124.

The screw assembly formed by the grooved head 141 and bore 139 along with ball bearings 150 induces an axial extension of torsion bar 137 with rotational movement of the lever 130 about the axis 126, separating tapered mating surfaces 154 and 155 of the shank 138 and collar 124, respectively, with minimal rotational force. Also the entirety of the internal assemblies is protected by soft, low friction, teflon or other suitable o-ring seals 156 and 158 at either ends of the assembly.

The adjustment sequence for the tool of FIGS. 6A and 6B includes an initial table motion along arrow 134 sufficient to cause a table mounted stop 135 to engage the pin 132 and thus to unlock the collar 124. This in turn permits collar 124 to swing to a radially minimum cutting radius under the torque of spring 148. Thereafter a table movement along arrow 128 is provided to engage the pin 122 against a further table stop 133. Since axis 126 of collar 124 is offset from the central axis of shank 138, this rotates collar 124 and causes the cutting tip 120 to move radially outward until the desired cutting radius is set. Thereafter, without further table motion along arrow 128, motion is reversed along arrow 134 causing the arm 130 to return under the force of torsion bar 137, locking the collar 124 on the shank of the machine tool.

A boring bar constructed in the above-described manner has a useable diameter adjustment range of approximately 18% and may be used in a medium to high torque application to yield an accuracy of 0.0001 inch to 0.0003 inch.

Figure 7B:
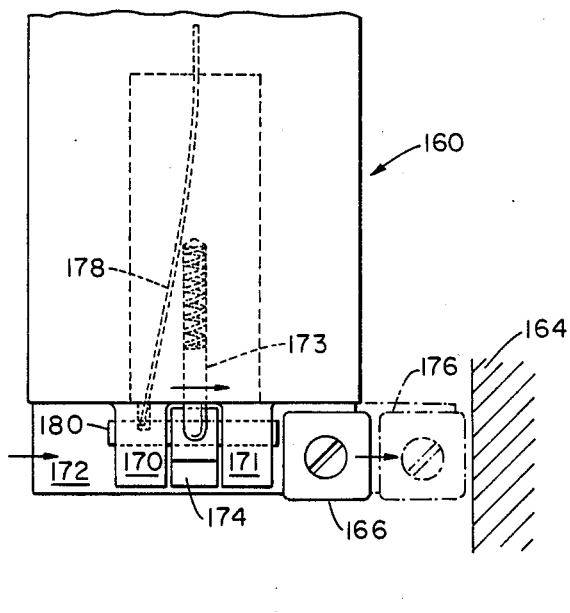
FIG. 7B shows a side cross-sectional view of the boring tool of FIG. 7A.
Figure 7C:
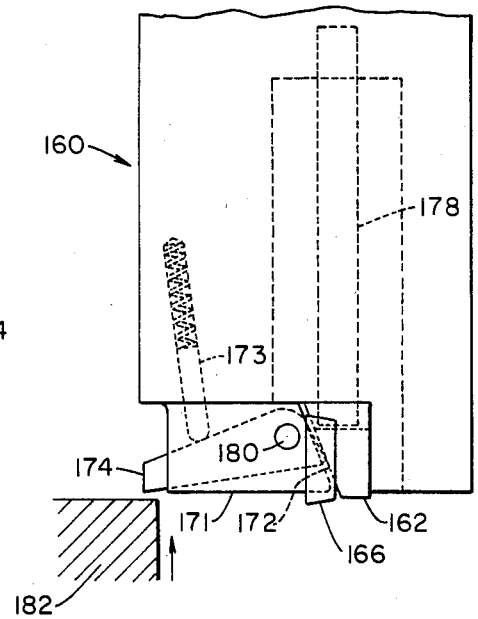
FIG. 7C shows a side plan view of the boring tool of FIG. 7A showing a cutting tip securing lever engaged.
Figure 7A:
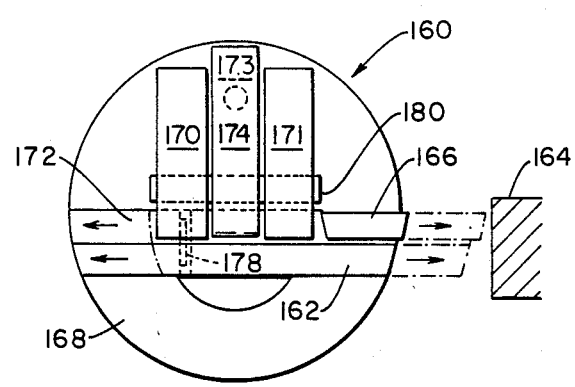
FIG. 7A shows an end view of a further alternate embodiment of a boring tool according to the present invention.

Another boring bar 160 according to the present invention is shown in FIGS. 7A-7D. An axial view of boring bar 160 is shown in FIG. 7A and shows a radially movable cutting tip support bar 162. Cutting radius adjustment is made by direct application of force by a table mounted stop 164 to support bar 162, thereby adjusting the cutting radius of a cutting tip 166 fastened to the support bar 162. The support bar 162 is retained on the boring tool 160 by being captured between an end section 168 and opposite, cam action level 174. On either side of lever 174 are guide blocks 170 and 171 which engage bar 162 sufficiently to resist torque resulting from machining by tip 166, but also to allow radial sliding motion of the bar 162 for adjustment. The lever 174 is rotatably moveable about a pin 180 retained in blocks 170 and 171. On the end of the support bar 162 away from tip 166, the support bar 162 has a beveled projection 172. Block 170 is undercut in a mating bevel to prevent bar 162 from falling off the end of tool 160.

Clamp lever 174 comprises an undercut beveled surface mating with the bar projection 172 and is spring loaded by a pin 173 to assume the position illustrated in FIG. 7C, locking the bar 162. When the lever 174 is depressed as discussed as below, the compression force is released from the surface 172, allowing radial sliding movement of the support bar, 162.

In this embodiment of the present invention, the reference position of the support bar 162, when released by actuation of lever 174, typically against a table driven stop 182, is outward to a maximum cutting radius shown in FIGS. 7A and 7B in a phantom outline position labeled 176. The support bar 162 is urged by a spring 178 engaging bar 162 from within the body of tool 160. Bar 162 is moved inward to the desired cutting edge radius by table motion against stop means 164.

Figure 7D:
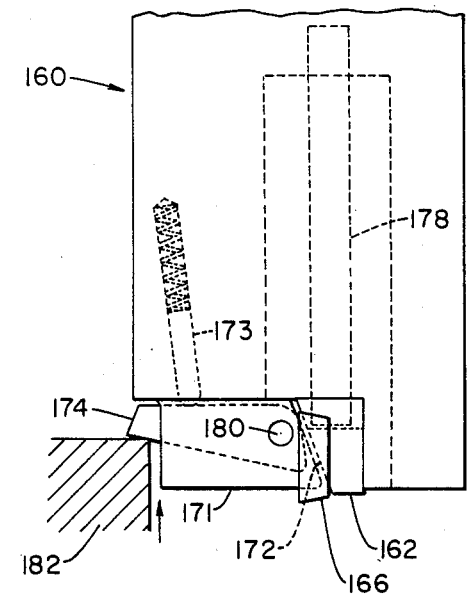
FIG. 7D shows the view of FIG. 7C with the securing lever released.

A side view of the cutting tool 160 is shown in FIGS. 7C and 7D. The lever 174 is shown engaging the support bar 162 in FIG. 7C and in a released condition in FIG. 7D. The spring 178 and the support bar beveled projection 172 are more clearly shown in FIG. 7D illustrating the mating of the lever 174 with projection 172. In FIG. 7D, the external stop 182 is moved axially downward, shown here as a vertical motion against the lever 174, causing the projection 172 of the support bar 162 to be disengaged. At this time the spring 178 moves the support bar 162 forward until it engages the stop 164. The boring bar constructed in this manner allows a wide range of diameter adjustment, typically 50%. Furthermore, the boring bar may adequately sustain high torque and provide an accuracy within the range 0.0006 inches to 0.0020 inches.

The tools of FIGS. 6A, 6B, 7A, 7B, 7C, and 7D are utilized in an adjustment sequence which follows the pattern of FIGS. 5 and 5A.

Figure 8:
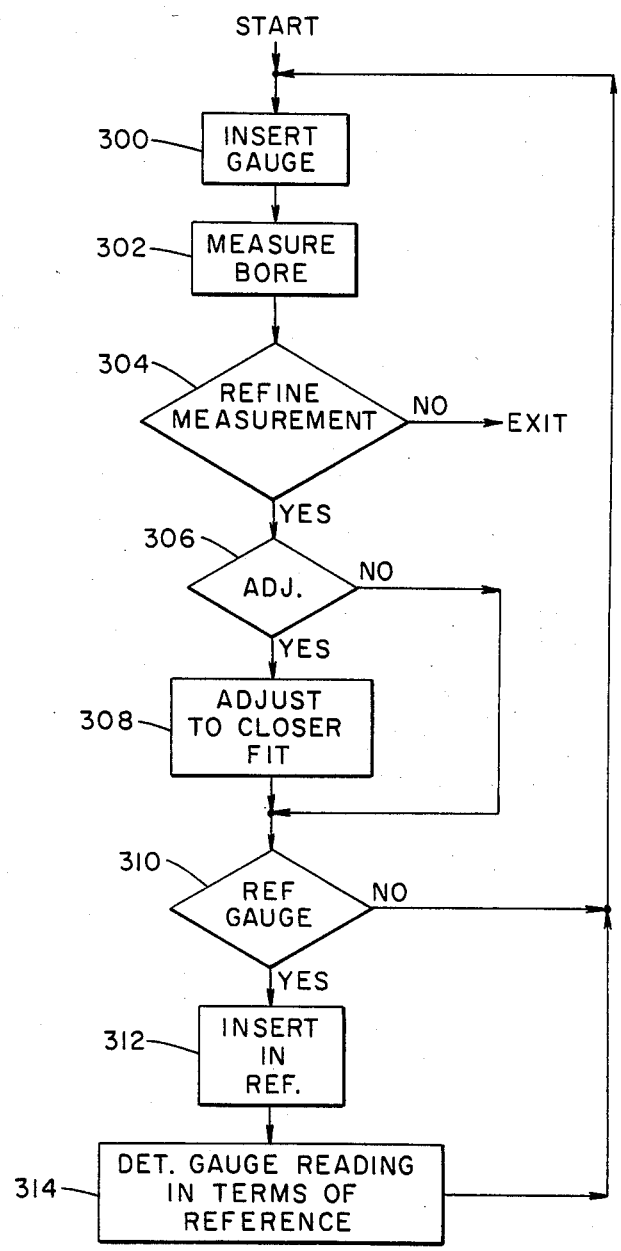
FIG. 8, is a flow chart of a looped measurement sequence using the present invention.

The present invention may be applied to tools other than cutting tools and in particular to an adjustable measurement tool such as a capacitive or pneumatic gauging plug. A capacitive gauging plug is typically provided for insertion within a hole and senses the hole diameter by capacitively gauging the distance between the plug perimeter on several sides and the inner wall of the hole. Because the accuracy of the gauging system tends to degrade as the distance between the perimeter of the gauge and the inner wall of the bore expands, the measurement gauge may preferably be made variable such that this distance can be decreased by expansion of the capacitive sensors of the gauge to more closely fit the bore. The use of such a gauge in accordance with the present invention is illustrated in FIG. 8. Such a process commences from a START state in which the usual system initializations have been achieved. In a subsequent step 300, the gauge, in this case typically a capacitive hole diameter gauge, is inserted within a bore to be gauged and the bore capacitively measured in a step 302. As part of the initialization achieved prior to the START state, the location of the bore is known in system memory such that the insertion in step 300 can be accurately achieved.

Subsequent to step 300 a decision step 304 is entered in which processing may branch either to an exit state if the system has been programmed to make a simple, noniterative measurement or to continue in accordance with the invention by proceeding to a decision step 306 which tests programming instructions to determine whether processing is to include an adjustment of the measuring gauge. If an adjustment is intended, processing proceeds through a step 308 wherein the measurement tool is adjusted in accordance with the techniques similar to those described above with respect to the adjustment of a boring bar utilizing a table mounted fixture to which a measurement tool located on the system saddle 25 or table is driven to induce a predetermined expansion or contraction in the capacitive sensors. For purposes of use of the invention with a measurement gauge a typical sensor is illustrated in FIGS. 9A–C.

After step 308, or step 306 in the case of a program indication of no adjustment, a decision step 310 is entered which samples programming instructions to determine whether processing is intended to include calibration of the adjusted or unadjusted gauge in a reference bore. In such case, processing continues from decision step 310 to step 312 in which the gauge as adjusted, or unadjusted, is inserted into a reference bore associated with the support table and, in step 314, the bore diameter of the adjusted, or unadjusted, gauge in the reference bore is read and calibrated against the known diameter of the reference bore to provide a calibration of the reading of the gauge when the system returns to processing step 300 to regauge the bore. Typically adjustment is used to provide a wider range of utilization and a preferable fit for greater accuracy. Iteration may continue through several loops until decision step 304 indicates that the accuracy is sufficient for system purposes and the iterative gauging loop is terminated by passing to the exit state. Open loop adjustment (without use of a reference bore) may be sufficiently accurate for many applications if the wedge angle of the gauge of FIGS. 9A–C is small.

FIGS. 9A, 9B and 9C illustrate an embodiment of the invention for machine tool adjustable gauging utilizing, in FIG. 9A, a bore gauge 320. The bore gauge 320 includes a chucking taper 322 supported above a central body 324 containing an electronics module 325 to be described below. A pair of arms 326 and 328 extend below the central body 324 and are separated by a central slot 330 which upwardly narrows toward the body 324. Contained within this slot 330 is a wedge 332 resiliently held between knife edge projections 334 and 336 by the inwardly directed spring force of arms 326 and 328. The wedge 332 has, near its top, a transverse bar 338 which extends either side of the slot 330 and is held in position by retaining rings 340.

Located along the bottom, outwardly facing sides of each arm 326 and 328, are respective, capacitive electrodes 342 and 344. Each electrode 342 and 344 is insulated from the material of the arms 326 and 328 and capable of sensing capacitance across the gap between itself and the inner surface of a bore being gauged. Leads 345 run from the electrodes 342 and 344 to the electronic module 325. Module 325 typically includes electronics, that may be battery powered, to provide a conversion of capacitively sensed gap between each electrode 342 and 344 and the inner, bore wall, to a corresponding frequency which is then transmitted electromagnetically to a suitable receiver 346, typically located on the non-rotating portion of the machining center. Receiver 346 provides a suitably demodulated signal to the signal processor 31 illustrated in FIG. 1A.

In operation, the adjustment of the distance between the capacitive electrodes 342 and 344 and the bore wall is accomplished by motion of the bar 338 up or down in engagement with a table mounted fixture 348. Vertical motion of the bar 338 is produced by Z-axis motion of the spindle 14 on saddle 26. Saddle motion of a predetermined magnitude to produce the desired gauge adjustment is produced in accordance with the teaching above with respect to boring tool adjustment.

A typical adjustable gauge in accordance with the present invention will be provided for gauging a nominal diameter bore, such as a one inch diameter bore. The gauge would be adjustable over an adjustment range of +0.01 inches with a 100 to 1 mechanical advantage between the separation produced between the electrodes 342 and 344 and the motion applied to the bar 338.

The above described machining system and implements permit far greater automation and accuracy in machine tool operation. The specific description is exemplary only, the scope of the invention being as shown in the following claims.

What is claimed is:

1. A process of operating a machine tool system having means for providing a plurality of tool positioning motions along the axes of at least one coordinate system comprising the steps of:

engaging an adjustable tool in an adjustment fixture associated with a workpiece carrier of a machining center;

moving said adjustable tool in a plurality of said tool positioning motions relative to said fixture to adjust, from the resulting motion, said tool in coordinates referenced to said machining center without direct measurement of the tool adjustment to produce an adjustment of said tool to provide the desired cutting dimension;

disengaging said adjustable tool from said fixture;

machining said workpiece with said tool as adjusted;

measuring the machined dimension of said workpiece;

re-engaging said tool in said fixture;

moving said adjustable tool in a plurality of said tool positioning motions relative to said fixture to provide from the resulting motion a further adjustment in the machined cut dimension as referenced to the coordinates of said machining center, said further adjustment being made without direct measurement to be of a magnitude corresponding to the difference between the measured dimension and a further desired machined dimension; and remachining said workpiece with said tool as further adjusted to produce said further desired machined dimension.

2. The process of claim 1 wherein said engaging and re-engaging steps further include the initial step of resetting said tool to a reference dimension prior to adjusting said tool to the initial or further desired dimension.

3. The process of claim 1 further including the step of repeating said re-engaging and remachining step a selected number of times with each further desired dimension increasing progressively toward a final machined dimension.

4. The process of claim 1, 2 or 3 wherein said engaging and re-engaging steps include the steps of driving said tool against a stop associated with said fixture a distance corresponding to the amount by which said tool is to be adjusted to produce said initial and further desired dimensions respectively.

5. The process of claim 1 wherein said tool is a boring bar.

6. The process of claim 5 wherein said measuring step includes measuring bore diameter.

7. The process of claim 1 or 6 wherein said measuring step includes the step of applying a contact finger to the machined dimension of said workpiece and detecting the dimension thereof by means of an interferometer.

8. A process of operating a machine tool system having means for providing a plurality of tool positioning motions along the axes of at least one coordinate system comprising the steps of:

engaging an adjustable tool in a fixture associated with a machining center;

moving said adjustable tool in at least one of said tool positioning motions relative to said fixture to adjust said tool in coordinates referenced to said machining center to produce an adjustment of said tool to provide the desired cutting dimension;

disengaging said adjustable tool from said fixture;

machining a workpiece with said tool as adjusted;

measuring the machined dimension of said workpiece;

re-engaging said tool in said fixture to provide a further adjustment in the machined cut dimension as referenced to the coordinates of said machining center, said further adjustment being of a magnitude corresponding to the difference between the measured dimension and a further desired machined dimension;

remachining said workpiece with said tool as further adjusted to produce said further desired machined dimension; and said tool positioning motions and said step of moving said adjustable tool providing horizontal, axial, and rotational motions.

* * * * *